UNITED STATES PATENT OFFICE 2,087,565

QUATERNARY AMMONIUM COMPOUNDS AND A PROCESS OF PREPARING THEM

Gerhard Balle and Kurt Eisfeld, Frankfort-on-the-Main, Germany, assignors to General Aniline Works, Inc., New York, N. Y., a corporation of Delaware No Drawing. Application September 10, 1935, Serial No. 39,993. In Germany June 24, 1931

21 Claims. (Cl. 260—106)

We have found that valuable quaternary ammonium compounds may be prepared by causing esters of such carboxylic acids as contain a reactive halogen atom or another reactive anion to react with tertiary organic bases. The ester-like products thus obtained may be saponified or may be transformed into amide-like products by means of ammonia or primary or secondary amines or derivatives thereof. The new products correspond to the general formula:

$$X \equiv \overset{Y}{\underset{|}{N}} - RZ$$

wherein the group $X \equiv N$ means a tertiary base, Y stands for an anion, such as, for instance, halogen or the hydroxyl group, R means a hydrocarbon radical and Z stands for a carboxyl group which may be esterified or may be amidated. Thus there may be formed, for instance, by the action of chloroacetic acid methyl ester upon tributylamine the chloride of the tributyl-betain-methyl-ester of the formula:

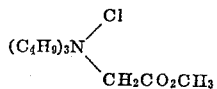

As tertiary bases there may be used, for instance, trimethylamine, tributylamine, butyldiethanolamine, amyldipropanolamine, triethanolamine, tripolyethanolamine, methyl-bis-(dihydroxypropyl)-amine, tetramethylethylenediamine, tetraoxyethylethylenediamine, tertiary polyethylenepolyamines, pyridine, hexamethylenetetramine, cyclohexyldimethylamine, dimethylaniline, diethanolaniline, dimethylglucamine, hexadecylmethylglucamine, dodecyldimethylamine, oleyldiethanolamine, stearylpolyethanolamine; furthermore the amines which have been alkylated or hydroxylated or polyhydroxylated to the tertiary stage and which may be prepared from the acids contained in natural fats, oils or waxes, according to one of the known methods, for instance, by reducing the corresponding acid amides or acid nitriles.

For the reaction of these amines there may be used, for instance, all carboxylic acid esters which contain a reactive halogen atom such as, for instance, chloroacetic acid, alpha-chloropropionic acid, beta-chloropropionic acid, alpha-bromobutyric acid, alpha-bromolauric acid or the like esterified with an aliphatic, aromatic or hydroaromatic alcohol as well as with a phenol; furthermore, for instance, the sulfuric acid esters of hydroxycarboxylic acid-esters such as the sulfuric acid ester of castor-oil-butyl-ester or the like.

The compounds of the above formula may be prepared by warming the amine with one of the aforesaid or an analogous ester (to about 70° C. to about 100° C.). By using amines with a high number of carbon atoms it is necessary to raise the temperature (to about 130° C. to about 150° C.) and perhaps to prolong the duration of the reaction; some amines, especially those of the aromatic series or those of a very high molecular weight, or esters of high molecular weight require heating under pressure at a temperature of about 100° C. to about 150° C. It may in certain cases be of advantage to work in the presence of a neutral solvent.

The ester-like compounds thus prepared which partly form crystals, partly have a honey- to fat-like consistency are soluble in neutral, acid or alkaline aqueous solutions. They are also highly stable to the action of the salts that cause the hardness of the water as well as to other electrolytes which may be present.

By treating the ester-like products with saponifying agents there are obtained, with elimination of the respective alcohol, salt-like or soap-like bodies which, just as the products treated, are easily soluble in neutral, acid or alkaline aqueous solutions. Under suitable conditions, for instance, by warming with alkaline agents, such as baryta or $BaCO_3$ it is possible to substitute the OH-group for the halogen.

By treating the ester-like products with ammonia or organic primary or secondary bases of their substitution products such as, for instance, amino- or alkylamino-alkyl-sulfonic acids, aminoarylsulfonic acids, aminocarboxylic acids, especially their mixtures such as, for instance, the degradation products of albuminous substances, or their water-soluble salts, furthermore the hydroxyamines, halogenamines and the like, new products of amide-like nature are obtained which have exactly the same properties of solubility.

The importance of the herein described products lies in their special properties of solubility and especially in the various possibilities of substituting them. The products may be used for nearly all kinds of treatments or improvements of crude or treated textile fibres, animal skins, leather or the like, first of all, in the cleansing industry as emulsifying agents, wetting agents, as agents for softening textiles, for brightening, fulling and sizing, in the dyeing industry as dispersing and leveling agents, through-dyeing and fixing agents, as addition to mercerizing lyes as well as foam-agents in flotation processes and the like.

The following examples serve to illustrate the invention, but they are not intended to limit it thereto, the parts being by weight:

(1) Equimolecular quantities of butyldiethanolamine and chloroacetic acid ethyl ester are heated for ½ to 1 hour at 80° C. to 90° C. A yellow body of honey-like consistency is obtained, which dissolves in water to a clear solution. The product dissolves also in caustic soda solutions up to 35° Bé. to a clear solution and imparts to such solutions a very good power for wetting cotton. For the same purposes products may be used which have been prepared in the same manner from triethanolamine and chloroacetic acid butylester or from dipropanolbutylamine and chloroacetic acid butylester.

A product which is soluble in caustic soda solution up to about 40° Bé. and possesses a very good power for wetting cotton tissue may also be prepared by treating the product which is obtainable in the beforementioned manner from methyldiethanolamine and chloroacetic acid methylester with the equivalent amount of butylamine whereby the transformation of the methylester group into the butylamide group takes place with heat evolution.

(2) 161 parts of butyldiethanolamine are heated for about 1 hour at 100° C. to 110° C. with 108 parts of monochloroacetic acid-methylester. The reaction product forms a tough, feebly yellow condensation product. After cooling, it is mixed with 185 parts of dodecylamine, the dodecylamide of the condensation product being formed with strong evolution of heat. After heating for half-an-hour at about 100° C. the methylalcohol formed is distilled off and a yellow tough mass is obtained. The product is easily soluble in water and no precipitates are formed in the solution, either by an acid or a base.

Products of same properties may be obtained by causing equimolecular quantities of pyridine and chloroacetic acid-methylester to react with each other and causing the equimolecular quantity of oleylamine to react with the product formed.

With the aid of these bodies, there may be prepared aqueous emulsions of products which are otherwise insoluble in water such as, for instance, of fats, oils, waxes and the like; the emulsions may be used for different purposes in the textile and leather industry.

(3) At 5° C. to 10° C. 120 parts of trimethylamine are introduced into a solution of 216 parts of chloroacetic acid-methylester in 250 parts of benzene; thereupon, the mixture is boiled for a short time under reflux. The crystals formed are separated from the benzene and melted with 450 parts of oleylamine. After 3 to 4 hours the transformation into the oleylamide of the trimethylbetain is finished at a temperature of the melt of 100° C. The product dissolves in water to a clear solution. It improves the fastness to water and perspiration of the substantive dyeings to a large extent; furthermore, vegetable fibers as well as cellulose artificial silks, which have been pretreated therewith, may be dyed with acid wool dyestuffs clear deep tints. To prepare the threads for dyeing with acid wool dyestuffs the threads leaving the nozzles may be treated with the trimethylbetainoleylamide simultaneously with the coagulation or the said amide may be added to the viscose already before the spinning operation.

Instead of trimethylamine there may be used with the same good result pyridine or dimethylaniline.

(4) 233 parts of palmnut oil dimethylamine are heated for half-an-hour at about 120° C. to about 130° C. with 108 parts of chloroacetic acid methylester; a distinct evolution of heat is at first observed. A honey-colored tough oil is obtained which dissolves in water to a clear solution. The ester obtained is saponified with sodium carbonate or caustic soda solution and a product of soap-like consistency is obtained which dissolves in water of any degree of hardness to a clear solution and possesses a very good foaming power. The product has especially in neutral and alkaline baths a very good power for cleansing textile materials.

Instead of palmnut oil dimethylamine there may be used with a still better result a mixture of amines which is obtainable by catalytically reducing amides or nitriles of more or less hardened fish-oil-fatty acids and has been transformed into a tertiary compound by the action of ethyleneoxide or propyleneoxide.

(5) The product described in Example 4 prepared from palmnut oil dimethylamine and chloroacetic acid methylester is mixed with the equivalent quantity of methylalcoholic methylamine solution whereby the temperature of the mixture rises to the boiling point of methanol. The methanol is distilled off; the methylamide of the starting condensation product remains in the form of a yellowish salve-like body. By treating wool with a solution of this amide the capacity of the treated fiber for absorbing wool dyestuffs is essentially enhanced.

However, it is not possible to use a product of the said kind in the dye-bath since precipitates are formed if the dyestuffs which for the most part contain sulfo groups are used together with the auxiliary product containing a quaternary nitrogen atom. This disadvantage may be avoided by using as starting base primary palmnut oil amine or another primary amine such as, for instance, stearyl amine, oleylamine, and the like, which, by introduction of polyglycolic ether radicals, has been transformed into a water-soluble tertiary compound.

Thus, for instance, stearylamine is transformed with 10 mols of ethylene oxide to a tertiary amine which contains two polyglycolic ether radicals at the nitrogen. This tertiary amine is caused to react, as described in Example 4, at first with chloroacetic acid methylester or beta-chloropropionic acid-methylester and then with methylamine. The water-soluble final product does not yield precipitates on addition of dyestuff sulfonic acids or carboxylic acids and also not on addition of, for instance, soap or synthetic washing agents.

Instead of methylamine there may also be used the equivalent quantity of taurine- or methyltaurine sodium salt. A product of very good cleansing power is thus obtained.

(6) 116 parts of tetramethylethylenediamine are mixed with 216 parts of chloroacetic acid methylester whereby the temperature rises to about 130° C. After cooling, a tough water-soluble mass is formed. This mass is warmed for 3 hours at about 100° C. to about 120° C. with 80 parts of ethylenediamine of 100 per cent. strength or the corresponding quantity of an aqueous ethylenediamine solution. After cooling, a clear resin-like glassy mass is obtained which dissolves in water to a clear solution.

By using, instead of the ethylenediamine, the equivalent quantity of a monovalent amine such as, for instance, butylamine, dodecylamine or stearylmethylamine, more or less tough masses are obtained which likewise dissolve in water to a clear solution and may be used in the improvement of artificial silk.

(7) Products adapted for rendering artificial silk soft and pliable may be prepared by heating, for instance, equimolecular quantities of stearyldimethylamine and alpha-bromolauric acidbutylester for about 3 to 5 hours at 100° C. to 120° C.

By using, instead of the stearyldimethylamine, a stearyldipolyhydroxyethylamine (cf. Example 5), products are obtained which, without causing precipitation of the dyestuffs, may be used in the dye-bath.

(8) As described above, 283 parts of stearyldimethylamine are caused to react with 108 parts of chloroacetic acidmethylester. 161 parts of methyltaurine sodium salt and 500 parts of alcohol are added to the reaction mixture and the batch is then boiled for about 2 to 3 hours under reflux. The crystallized sodium salt may be filtered with suction. It is soluble in water, stable against acids and alkalies and represents a very good cleansing agent.

Instead of alcohol, water may also be used as solvent for the reaction. A product of similar properties is obtained by using, instead of taurine, the corresponding quantity of sarcosine sodium salt or the sodium salts of degraded albuminous substances.

(9) 400 parts of the sodium salt of sulfuric acid ester of castor fatty acid oil methyl ester are added to 185 parts of tributylamine and the whole is then heated in a closed vessel for about 6 to 8 hours at 150° C. The tough yellow-brown product obtained dissolves in water to a clear solution and has a very good wetting power.

We claim:

1. The process which comprises heating the tertiary dimethylamine obtained from the mixture of carboxylic acids which are present in palm nut oil with chloroacetic acid methyl ester.

2. The process which comprises heating stearyl-polyethanolamine, containing 10 mols of ethylene-oxide, with alpha-chloroacetic acid-methylester.

3. The product of the formula:

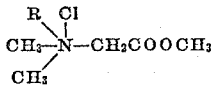

wherein

stands for the tertiary dimethylamine obtained from the mixture of carboxylic acids which are present in palm nut oil.

4. The product of the formula:

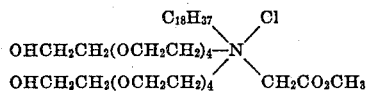

5. The process which comprises heating a tertiary organic base of the group consisting of tertiary aliphatic bases, containing at least one radical of more than 2 carbon atoms, tertiary cycloaliphatic, aromatic and heterocyclic bases with the ester of an aliphatic carboxylic acid containing an anion of the group consisting of halogen and —$OSO_2OH$.

6. The process which comprises heating a tertiary aliphatic base, containing at least one aliphatic hydrocarbon radical of at least 8 carbon atoms, with the ester of an aliphatic halogen containing carboxylic acid.

7. The process which comprises heating a tertiary organic base of the group consisting of tertiary aliphatic bases, containing at least one radical of more than 2 carbon atoms, tertiary cycloaliphatic, aromatic and heterocyclic bases with the ester of an aliphatic carboxylic acid, containing an anion of the group consisting of halogen and —$OSO_2OH$, and treating the reaction product with a saponifying agent.

8. The process which comprises heating a tertiary aliphatic base, containing at least one aliphatic hydrocarbon radical of at least 8 carbon atoms, with the ester of an aliphatic halogen containing carboxylic acid, and treating the reaction product with a saponifying agent.

9. The process which comprises heating a tertiary organic base of the group consisting of tertiary aliphatic bases, containing at least one radical of more than 2 carbon atoms, tertiary cycloaliphatic, aromatic and heterocyclic bases with the ester of an aliphatic carboxylic acid containing an anion of the group consisting of halogen and —$OSO_2OH$, and treating the reaction product with a compound of the formula:

wherein $X_1$ stands for a member of the group consisting of H, aliphatic hydrocarbon radicals, aliphatic hydrocarbon radicals substituted by $NH_2$, aliphatic hydrocarbon radicals substituted by OH, aliphatic hydrocarbon radicals substituted by $SO_3H$, aliphatic hydrocarbon radicals substituted by COOH, $X_2$ stands for a member of the group consisting of H and aliphatic hydrocarbon radicals.

10. The process which comprises heating a tertiary aliphatic base, containing at least one aliphatic hydrocarbon radical of at least 8 carbon atoms, with the ester of an aliphatic halogen containing carboxylic acid and treating the reaction product with a compound of the formula:

wherein R stands for an aliphatic hydrocarbon radical of at least 8 carbon atoms.

11. The process which comprises heating a tertiary organic base of the group consisting of tertiary aliphatic bases, tertiary cycloaliphatic bases, tertiary aromatic bases and heterocyclic bases with the ester of an aliphatic carboxylic acid, the acyl residue of which has at least 5 carbon atoms and contains an anion of the group consisting of halogen and —$OSO_2OH$.

12. The process which comprises heating a tertiary aliphatic base, containing at least one aliphatic hydrocarbon radical of at least 8 carbon atoms, with the ester of an aliphatic halogen containing carboxylic acid, the acyl residue of which has at least 5 carbon atoms.

13. The process which comprises heating a tertiary organic base of the group consisting of tertiary aliphatic bases, tertiary cycloaliphatic bases, tertiary aromatic bases and heterocyclic bases with the ester of an aliphatic carboxylic acid, the acyl residue of which has at least 5 carbon atoms and contains an anion of the group consisting of halogen and —OSO₂OH and treating the reaction product with a saponifying agent.

14. The process which comprises heating a tertiary aliphatic base, containing at least one aliphatic hydrocarbon radical of at least 8 carbon atoms, with the ester of an aliphatic halogen containing carboxylic acid, the acyl residue of which has at least 5 carbon atoms, and treating the reaction product with a saponifying agent.

15. The process which comprises heating a tertiary organic base of the group consisting of tertiary aliphatic bases, tertiary cycloaliphatic bases, tertiary aromatic bases and heterocyclic bases with the ester of an aliphatic carboxylic acid, the acyl residue of which has at least 5 carbon atoms and contains an anion of the group consisting of halogen and —OSO₂OH, and treating the reaction product with a compound of the formula:

wherein X₁ stands for a member of the group consisting of H, aliphatic hydrocarbon radicals, aliphatic hydrocarbon radicals substituted by NH₂, aliphatic hydrocarbon radicals substituted by OH, aliphatic hydrocarbon radicals substituted by OSO₃H, aliphatic hydrocarbon radicals substituted by COOH, X₂ stands for a member of the group consisting of H and aliphatic hydrocarbon radicals.

16. The process which comprises heating a tertiary aliphatic base, containing at least one aliphatic hydrocarbon radical of at least 8 carbon atoms, with the ester of an aliphatic halogen containing carboxylic acid, the acyl residue of which has at least 5 carbon atoms, and treating the reaction product with a compound of the formula:

wherein R stands for an aliphatic hydrocarbon radical of at least 8 carbon atoms.

17. The products of the general formula

wherein X≡N means a tertiary aliphatic base containing at least one aliphatic hydrocarbon radical of at least 8 carbon atoms, R stands for an aliphatic hydrocarbon radical, X₁ stands for a member of the group consisting of H, aliphatic hydrocarbon radicals, aliphatic hydrocarbon radicals substituted by NH₂, aliphatic hydrocarbon radicals substituted by OH, aliphatic hydrocarbon radicals substituted by SO₃H, aliphatic hydrocarbon radicals substituted by COOH, X₂ stands for a member of the group consisting of H and aliphatic hydrocarbon radicals.

18. The products of the general formula:

wherein X≡N means a tertiary aliphatic base containing at least one aliphatic hydrocarbon radical of at least 8 carbon atoms, X₁ stands for an aliphatic hydrocarbon radical of at least 8 carbon atoms.

19. The products of the general formula:

wherein X≡N means a tertiary organic base of the group consisting of tertiary aliphatic bases, tertiary cycloaliphatic bases, tertiary aromatic bases and heterocyclic bases, Y stands for an anion of the group consisting of hydroxyl, halogen and —OSO₂OH, R stands for an aliphatic hydrocarbon radical of at least 4 carbon atoms, Z stands for a member of the group consisting of carboxylic group, esterified carboxylic groups and amidated carboxylic groups.

20. The products of the general formula:

wherein X≡N stands for a tertiary aliphatic base, R stands for an aliphatic hydrocarbon radical of at least 4 carbon atoms, X₁ stands for a member of the group consisting of H, aliphatic hydrocarbon radicals, aliphatic hydrocarbon radicals substituted by NH₂, aliphatic hydrocarbon radicals substituted by OH, aliphatic hydrocarbon radicals substituted by SO₃H, aliphatic hydrocarbon radicals substituted by COOH, X₂ stands for a member of the group consisting of H and aliphatic hydrocarbon radicals.

21. The products of the general formula:

wherein X≡N stands for a tertiary aliphatic base, R stands for an aliphatic hydrocarbon radical of at least 4 carbon atoms, X₁ stands for an aliphatic hydrocarbon radical of at least 8 carbon atoms.

GERHARD BALLE.
KURT EISFELD.

DISCLAIMER 2,087,565.—*Gerhard Balle* and *Kurt Eisfeld*, Frankfort-on-the-Main, Germany. QUATERNARY AMMONIUM COMPOUNDS AND A PROCESS OF PREPARING THEM. Patent dated July 20, 1937. Disclaimer filed August 4, 1938, by the assignee, *General Aniline Works, Inc.*

Hereby enters this disclaimer to that part of claim 19 in said specification which is in the following words, to wit: "carboxylic group", said words appearing directly after "of" in line 9 below the formula.

[*Official Gazette August 30, 1938.*]